(12) United States Patent
Gach (10) Patent No.: US 9,553,716 B2
(45) Date of Patent: Jan. 24, 2017

(54) NETWORK RECEIVER FOR A NETWORK USING DISTRIBUTED CLOCK SYNCHRONIZATION AND A METHOD OF ADJUSTING A FREQUENCY OF AN INTERNAL CLOCK OF THE NETWORK RECEIVER

(71) Applicant: Robert Gach, Seysses (FR)

(72) Inventor: Robert Gach, Seysses (FR)

(73) Assignee: Freescale Semiconductor, Inc., Austin, TX (US)

( * ) Notice: Subject to any disclaimer, the term of this patent is extended or adjusted under 35 U.S.C. 154(b) by 32 days.

(21) Appl. No.: 14/889,467

(22) PCT Filed: May 29, 2013

(86) PCT No.: PCT/IB2013/001328
§ 371 (c)(1),
(2) Date: Nov. 6, 2015

(87) PCT Pub. No.: WO2014/191785
PCT Pub. Date: Dec. 4, 2014

(65) Prior Publication Data
US 2016/0080140 A1    Mar. 17, 2016

(51) Int. Cl.
*H04L 7/00*  (2006.01)
*H04L 7/033*  (2006.01)
*H04L 12/64*  (2006.01)

(52) U.S. Cl.
CPC .......... *H04L 7/0087* (2013.01); *H04L 7/0016* (2013.01); *H04L 7/033* (2013.01); *H04L 7/0331* (2013.01); *H04L 12/6418* (2013.01)

(58) Field of Classification Search
CPC ........ H04L 7/00; H04L 7/0008; H04L 7/0016; H04L 7/0079; H04L 7/0087; H04L 7/033; H04L 7/0331; H04L 7/0337; H04L 12/6418
(Continued)

(56) References Cited

U.S. PATENT DOCUMENTS 3,646,272 A  *  2/1972  Kay ....................... H04J 3/0611
                                              370/503
2005/0251701 A1    11/2005  Fredriksson et al.
(Continued)

OTHER PUBLICATIONS

International Search Report and Written Opinion correlating to PCT/IB2013/001328 issued on Dec. 16, 2013.
(Continued)

*Primary Examiner* — Young T Tse
(74) *Attorney, Agent, or Firm* — Charlene R. Jacobsen (57) ABSTRACT

A network receiver for a network using distributed clock synchronization and a method of adjusting a frequency of an internal clock of the network receiver are provided. The network receiver receives from the network an input signal and has an internal clock for generating a clock signal. The network receiver further includes a clock bit comparator and an adjustment signal generator. The clock bit comparator compares lengths of a first time period lapsed while receiving at least five consecutive bits of the signal and of an internal clock time interval representing the same number of bits as a number of bits of the first time period. The adjustment signal generator generates a frequency adjustment signal for controlling a frequency of the internal clock in dependence of a result of the comparison of the lengths to reduce a difference between the lengths.

20 Claims, 4 Drawing Sheets

(58) Field of Classification Search
USPC ......... 375/354–356, 360, 362, 364; 370/304, 370/350, 503, 520; 713/400, 600
See application file for complete search history.

(56) References Cited

U.S. PATENT DOCUMENTS

| | | |
|---|---|---|
| 2006/0123176 A1 | 6/2006 | Fredriksson et al. |
| 2009/0116603 A1 | 5/2009 | Wang et al. |
| 2012/0093268 A1 | 4/2012 | Elend |
| 2012/0185721 A1 | 7/2012 | Burgt et al. |
| 2013/0076451 A1 | 3/2013 | Kelling et al. |
| 2013/0250976 A1* | 9/2013 | Lindner ................ H04J 3/1688 370/509 |

OTHER PUBLICATIONS

Florian Hartwich, Armin Bassemir, "The Configuration of CAN Bit Timing", 6h International CAN Conference, Nov. 2 to 4, 1999, Turin, Italy.

"Road Vehicles—Controller Area Network (CAN)—Part 6: High-speed medium access unit with selective wake-up functionality", ISO 11898-6, STD version 2.2, Jul. 13, 2012.

"NXP HS-CAN transceiver TJA1145 & SBC UJA1168 for partial networking", NXP, 2011.

"L99PM72PXP", ST, Jul. 2011.

"OEM requirements for partial networking", version 2.2, SWITCH group, Mar. 2, 2012.

"AVR351: Runtime calibration and compensation of RC oscillators", ATMEL Corporation, 2008.

Shuhuan Yu, et al, "A Digital-Trim Controlled On-Chip RC Oscillator", Proceedings of the 44th IEEE 2001 Midwest Symposium on Circuits and Systems, 2001, MWSCAS 2001, vol. 2, pp. 882-885.

Scott Pape, "Application Note, AN2312/D, Jul. 2002, MC68HC908QY4 Internal Oscillator Usage Notes", Freescale Semiconductor, Inc., 2004.

Li Jiang, "Two high accuracy CMOS RC oscillators with different trimming approach", 10th IEEE International Conference on Solid-State and Integrated Circuit Technology (ICSICT), 2010, pp. 376-378.

Bo Wang, et al, "A high-accuracy CMOS on-chip RC oscillator", 10th IEEE International Conference on Solid-State and Integrated Circuit Technology (ICSICT), 2010, pp. 400-402.

ELMOS Semiconductor AG; "HS CAN Transceiver for Partical Networking—Advance Product Information"; Data Sheet QM-No. 25DS0055E.00; 39 pages (Jul. 27, 2011).

* cited by examiner

NETWORK RECEIVER FOR A NETWORK USING DISTRIBUTED CLOCK SYNCHRONIZATION AND A METHOD OF ADJUSTING A FREQUENCY OF AN INTERNAL CLOCK OF THE NETWORK RECEIVER

FIELD OF THE INVENTION

This invention relates to network receivers for a network that uses distributed clock synchronization. The invention further relates to a method of sampling a signal received from the network with distributed clock synchronization. The network receiver and the method may be used in a Controller Area Network (CAN).

BACKGROUND OF THE INVENTION

Various communication networks and communication protocols do not have a central clock but use distributed clock synchronization. In distributed clock synchronization type of networks, devices are able to communicate with each other over, for example, a bus without sharing a (central) clock signal. In such networks and protocols each device has an internal clock which needs to have a certain accuracy such that the devices can communicate with each other via the bus. If the internal clocks operate, within certain tolerances, at the same frequency or, in other examples, at frequencies that relate to each other, a receiver is able to synchronize with the transmitter and decode the received data packet without errors.

The required tolerances may be met by crystal or ceramic oscillators. However, in specific applications it is required that an oscillator is implemented on an integrated circuit without external components is used and, thus, it is required to use of a fully integrated RC or LC oscillator. It is relatively difficult to implement an integrated oscillator which provides the required accuracy especially when a very wide range of operating temperatures and a life-time of the devices is taken into account. Furthermore, in the specific applications, the network devices with the internal oscillators may be required to use limited power and to be manufactured cost efficiently. Therefore, there is an incentive to use low precision clock source in devices of a network that uses distributed clock synchronization. However, if the clock sources do not operate within the tolerance limits defined in the network and communication protocol specifications, they cannot be used to reliably synchronize to the received data.

An example of a network/communication bus with distributed clock synchronization is the Controller Area Network (CAN, ISO 11898) which is a message based network that is often used in vehicles and is also used in industrial automation and medical equipment. The CAN standard is designed to allow digital devices to communicate with each other via a bus without the presence of a host computer. The CAN physical layer specification defines also CAN high-speed medium access units with selective wake-up (SWU) functionality. Such devices wake-up or wake-up another circuitry in response to receiving particular messages via the CAN bus. Most CAN SWU devices are low-power devices and need to be manufactured relatively cost-effective—thus, the CAN SWU devices preferably have a cost clock source, and, as previously discussed, low cost clock sources are often a low precision clock source.

US2012/0185721 describes a possible solution for reliable receiving information with CAN SWU devices that have a low precision clock source. The cited patent application proposes to use multiple timing engines that sample received bits with slightly different frequencies and a timing engine resolver which determines which one of the multiple timing engines correctly samples the received bits. A disadvantage of the proposed solution of the cited patent application is that a plurality of timing/sampling engines for sampling the received signal must be implemented. This implementation incurs silicon area and test penalties to the die costs of an integrated circuit on which the CAN SWU devices are implemented.

SUMMARY OF THE INVENTION

The present invention provides a network receiver, a CAN network device, a vehicle, an integrated circuit and a method of adjusting a frequency of an internal clock of a network receiver for a network using distributed clock synchronization as described in the accompanying claims.

Specific embodiments of the invention are set forth in the dependent claims.

These and other aspects of the invention will be apparent from and elucidated with reference to the embodiments described hereinafter.

BRIEF DESCRIPTION OF THE DRAWINGS

Further details, aspects and embodiments of the invention will be described, by way of example only, with reference to the drawings. Elements in the figures are illustrated for simplicity and clarity and have not necessarily been drawn to scale.

Elements in the figures are illustrated for simplicity and clarity and have not necessarily been drawn to scale. In the Figures, elements which correspond to elements already described may have the same reference numerals.

DETAILED DESCRIPTION OF THE PREFERRED EMBODIMENTS

As discussed above, the Controller Area Network (CAN) network (ISO 11898) uses distributed clock synchronization. This means that there is no central clock or central clock signal, but that each device has its own internal clock and synchronizes to the transmitter via the received signals. In the following of this document, the invention is described in context of a CAN network, however, the invention also applies to other networks that use distributed clock synchronization.

Figure 1:
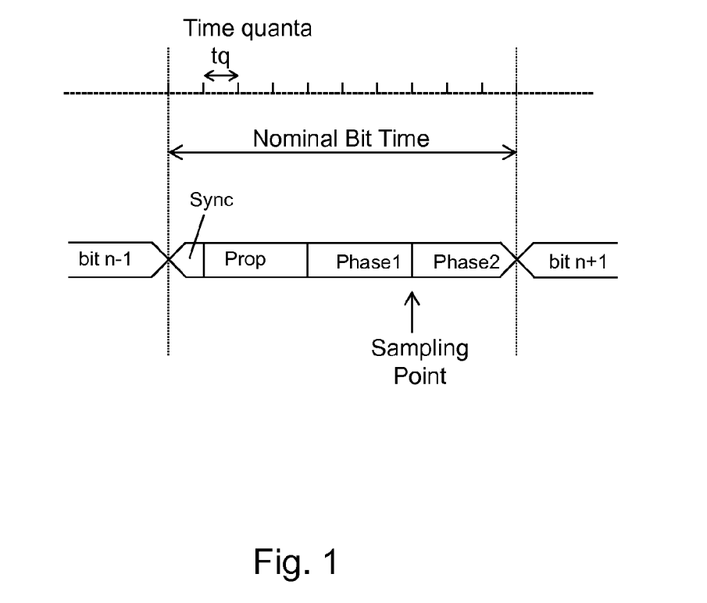
FIG. 1 schematically shows a bit time definition of a CAN network.
Figure 2:
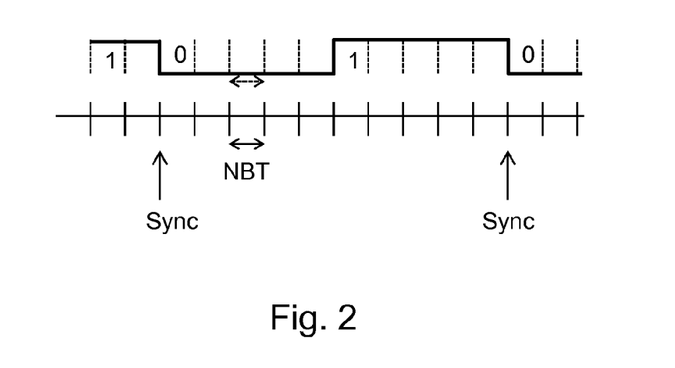
FIG. 2 schematically shows a possible serial communication bitstream in a CAN network, FIG. 3 schematically shows an embodiment of a network receiver according to the invention, FIG. 4 schematically shows a signal received by and a clock signal of a network receiver according to the invention, and FIG. 5 schematically shows a method according to the invention.

In, for example, US 2012/0185721A1 a description of the bit sampling and synchronization mechanism defined for CAN networks can be found. The discussion of FIGS. 1 and 2 is based on this description. More information about bit sampling and synchronization may be found in "The Configuration of the CAN Bit Timing" by Florian Hartwich et al., 6h International CAN Conference, 2-4 Nov. 1999, Turin, Italy.

In CAN devices, the internal clock base is extracted from the incoming data. As synchronization occurs on negative edges of the bits and if a long string of the same value bit, for example 1's, are received, there is no negative edge to allow synchronization. In order to limit the number of bits received before synchronization occurs, the CAN protocol uses bit stuffing. The CAN bit stuffing rule allows at most 5 consecutive bits with the same polarity, thus assuring that there are enough polarity changes in the data to synchronize sufficiently. For example, when 5 bits identical bits in a row are received, a stuffing bit of the opposite value may be put into the bit stream in order to force a transition. Under this rule, synchronization will occur within at least every 10 bits. Thus, the bit stream showed in FIG. 2 comprises a maximum of five consecutive 0's followed by a maximum of five consecutive 1's.

In CAN, a Nominal Bit Time (NBT) may be defined as presented in FIG. 1. In order to have a finer synchronization granularity than the NBT, Time Quanta (tq) are defined. A CAN bit is divided in four segments as shown in FIG. 1. These segments are related to the several physical delays in the system. The Sync segment may be the part of the bit time used to synchronize the various CAN devices on the bus. An edge may be expected within this segment. The Prop segment may be the part of the bit time which is used to compensate for physical delay times within the network. These delay times may consist of the signal propagation time on the bus and the internal delay time of the CAN receivers. The Phase 1 and Phase 2 segments may be used to compensate for edge phase errors. These segments may be lengthened or shortened by resynchronization. The data sampling point is the point of time at which the bus level is read and interpreted as the value of that respective bit. The data sampling point is defined as the transition from Phase 1 to Phase 2. However the receiver samples on each tq. If a data edge is received in another segment than the Sync segment, the receiver's internal time base is shifted by a number of time quanta tq, to align it with the incoming data. The maximum time shift is defined by the Sync Jump Width (SJW) parameter. The NBT may be up to 25 tq, while the SJW may be limited to 4 tq.

As the time base is only synchronized on negative edges, in the worst case scenario, it may take 10 bits before the internal time base is re-synchronized, as is shown in FIG. 2. At the second synchronization moment, the phase error of the receiving node's internal time base should not deviate more than the SJW. If the negative edge does not occur before the sample point, the frame cannot be decoded, as the bit is sampled with the wrong polarity. Therefore, at the synchronization moment, the phase shift between sender and receiver shall not be more than the SJW (<=4 Tq); otherwise decoding will not be possible. To achieve this, the allowed receiver clock tolerance is typically less than 1.5% for the receiver. This accuracy is calculated over 10 bits and depends on other factors, like, the network topology, clock frequency tolerance of the transmitter, and the expected jitter due to injection of RF fields. If the receivers include crystal oscillators, this requirement may be met easily. However, if receivers are not provided with crystals and have to operate with a fully integrated on-chip oscillator, this requirement becomes difficult to achieve. Especially, when the oscillator needs to be accurate over a wide temperature range and over a long lifetime (which is e.g. the case in automotive applications), it becomes, in particular, difficult to manufacture a fully integrated on-chip oscillator that operates within the required tolerance levels under all circumstances.

In the following of this document the Controller Area Network (CAN) network (ISO 11898) is used as an example of network to which the network receiver according to the invention may be coupled. It is to be noted that the network receiver may also be used in combination with other networks which use distributed clock synchronization.

Figure 3:
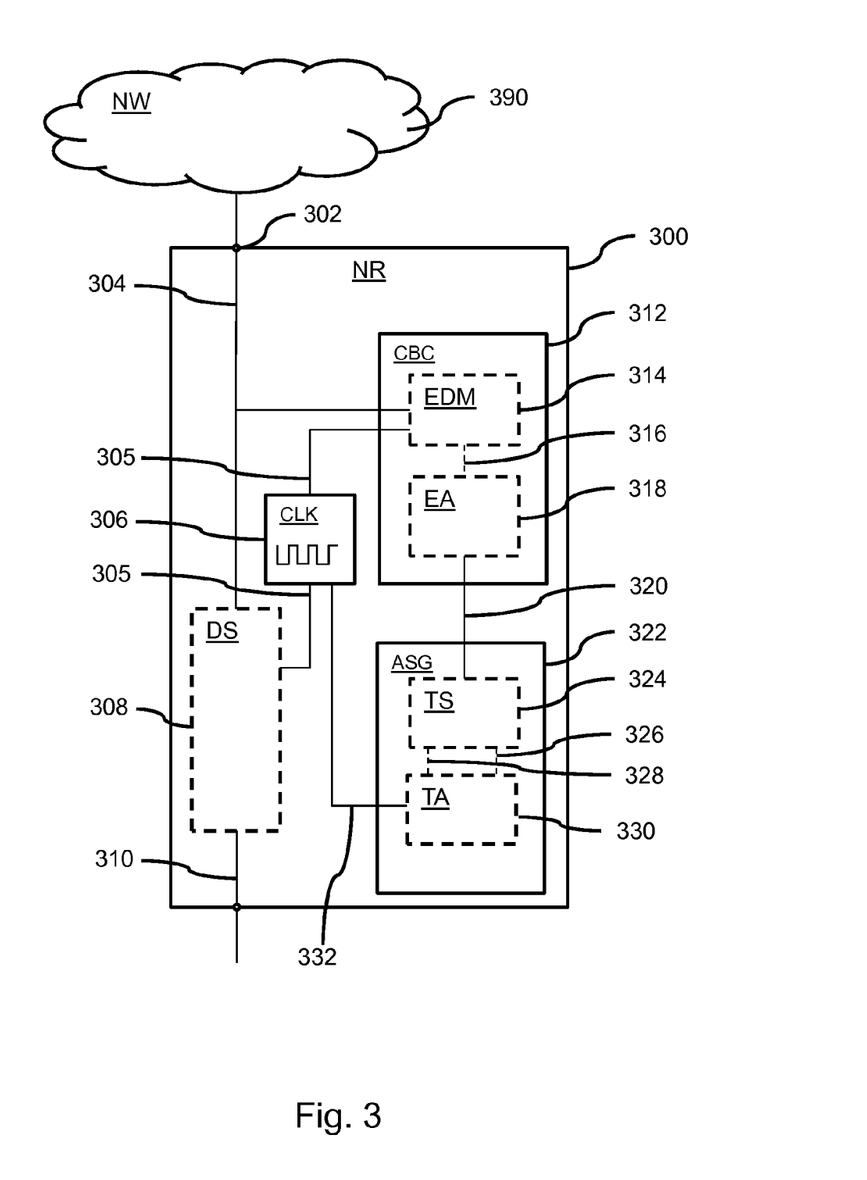

FIG. 3 schematically presents an embodiment of a network receiver 300, NR according to the first aspect of the invention. The network receiver 300, NR is coupled to a network 390, NW which uses distributed clock synchronization. This means that within the network 390, NW there is no central clock or central clock signal and each device coupled to the network has its own internal clock which is synchronized with the received signal, when receiving a (input) signal from the network NW, 390. The network receiver 300, NR has an input 302 at which an input signal 304 from the network NW, 390 is received (in the following of this document, the term "received signal 304" or "signal 304" refers to this received "input signal 304"). In an example, the network NW, 390 has a bus structure and the input 302 is coupled to the bus of the network NW, 390. For example, the network is a Controller Area Network (CAN) and the input 302 is coupled to the differential bus of the CAN network.

The network receiver 300, NR comprises an internal clock 306, CLK, a data sampler 308, DS, a clock bit comparator 312, CBC and a adjustment signal generator 322, ASG. The signal 304 received from the network NW, 390 is provided to the data sampler 308, DS and the clock bit comparator 312, CBC. The received signal 304 might be an analogue signal and comprises a series of data symbols which represent information. The data symbols are, for example, bits. In the following we assume that the received signal 304 comprises a train, or, in other words, a sequence, of bits.

The internal clock 306, CLK of the network receiver 300, NR generates a clock signal 305 having a particular frequency. The internal clock 306, CLK is configured to receive a frequency adjustment signal 332 which is used by the internal clock 306, CLK to adjust the frequency of the generated clock signal 305. In literature several examples of internal clocks may be found of which the frequency is adjustable by means of a frequency adjustment signal. For example, reference is made to the subsequent articles in which such internal clock circuits are discussed: Bo Wang, et al, "A high-accuracy CMOS on-chip RC oscillator", 10th IEEE International Conference on Solid-State and Integrated Circuit Technology (ICSICT), 2010, pp 400-402; Li Jiang, "Two high accuracy CMOS RC oscillators with different trimming approach", 10th IEEE International Conference on Solid-State and Integrated Circuit Technology (ICSICT), 2010, pp 376-378; Shuhuan Yu, et al, "A Digital-Trim Controlled On-Chip RC Oscillator", Proceedings of the 44th IEEE 2001 Midwest Symposium on Circuits and Systems, 2001, MWSCAS 2001, Vol 2, pp 882-885.

In practical embodiments of the internal clock 306, CLK, the internal clock has a preset frequency at which it starts its operation when it receives power, in other words, when it is switched on. This preset frequency may be programmed in the internal clock 306, CLK or the network receiver 300, NR shortly after manufacturing and before the network receiver 300, NR is shipped to a customer. The preset frequency should be relatively close to the frequency at which the internal clock 306, CLK should operate when the internal clock 306, CLK is 100% accurate. The manufacturer tests the internal clock 306, CLK under particular test conditions, such as at a particular temperature and with an 100% accurate supply voltage, and, thus, in real use outside the factory, the preset frequency may deviate from the 100% accurate clock signal. Furthermore, the preset frequency may also deviate over time because of aging.

Optionally, the frequency adjustment signal 332 comprises bytes of parallel transmitted binary bits or the frequency adjustment signal comprises a pulse width modulated binary signal. In both typical types of frequency adjustment signals, the information that is transported by the frequency adjustment signal indicates how the frequency must be adjusted. For example, to a slightly higher frequency, or to a slightly lower frequency. Or, for example, depending on the specific implementation of the internal clock 306, CLK, the frequency adjustment signal exactly indicates how much the frequency has to change. Or the frequency adjustment signal comprises a plurality of bits which control controllable switches of the internal clock 306, CLK, and a specific coding is used for the plurality of bits such that the frequency of the clock signal 305 generated by the internal clock 306, CLK is influenced by the received bits. Optionally, the internal clock 306, CLK comprises a tunable current source, and the tunable current source is tuned in dependency of the frequency adjustment signal 332. Optionally, the internal clock 306, CLK comprises a tunable voltage source, and the tunable voltage source is tuned in dependency of the frequency adjustment signal 332. Optionally, the internal clock 306, CLK comprises a controllable network resistor in an RC loop of the internal clock 306, CLK, and the network resistor is controlled in dependency of the frequency adjustment signal 332. Optionally, the internal clock 306, CLK comprises a controllable network capacitor in an RC loop of the internal clock 306, CLK, and the network capacitor is controlled in dependency of the frequency adjustment signal 332.

The data sampler 308, DS samples the received signal 304 at sampling moments. The results of the sampling form a digital output signal 310 which is constituted by a train of data symbols, for example, a sequence of bits. In the following it is assumed that the digital output signal 310 is formed by a train of bits. The sampling moments are selected moments of time which is somewhere in between the start of a received bit and the end of the received bit. The actual value of the received signal 304 at that specific moment of time is transformed into a digital value. During every period of time that represents a received bit, the input signal 304 is sampled to obtain the sequence of bits of the digital output signal 310.

In a specific embodiment, such as in the example of a CAN network, the period of time that constitutes a single bit is subdivided in several segments, see for example, FIG. 1. The period of time that constitutes a single bit comprises, for example, a first bit segment (Phase1) and a consecutive second bit segment (Phase2). The sampling moment is the transition moment from the first bit segment (Phase1) to the second bit segment (Phase 2). The length of the first bit segment (Phase1) and of the second bit segment (Phase2) is a setting of the network 390, NW or of the network receiver 300, NR and may be changed such that the relative position of the sampling moment with respect to the start of the bit and the end of the bit changes.

The clock bit comparator 312, CBC is configured to compare a length of a first time period of at least five consecutive bits of the received signal 304 with a length of an internal clock time interval that should represent the same number of bits of the first time period. It is to be noted that the term should is used, because, in the ideal case, the internal clock 306, CLK is 100% accurate and has exactly the correct frequency for synchronizing with the received signal. However, in reality the transmitter that transmitted the received signal 304 might have an internal clock that is not 100% accurate, the network receiver 300, NR has an internal clock that is not 100% accurate, and the network 390, NW might also introduce possible inaccuracies. According to the invention, the length of the internal clock time interval is defined by the (inaccurate) operation of the internal clock 306, CLK and has a length that, assuming the internal clock operates 100% accurate, should be equal to the length of the first time period. Once again, in other words, the first time interval represents a period of time which equals a specific number of received bits of the received signal 304. The internal clock time interval represents a period of time of which the network receiver 300, NR assumes, based on the information that it receives from its internal clock 306, CLK, that the length is equal to the length of the specific number of received bits.

When the length of the internal clock time interval is not exactly equal to the length of the first time period, the difference between the lengths of these periods of time is used by the clock bit comparator 312, CBC to generate a difference signal 320 which indicates the value of the difference. It is to be noted that it is not necessary that the difference signal 320 exactly indicates the amount of the difference in, for example, seconds—other units or indicators may be used as well.

In another embodiment, the clock bit comparator 312, CBC may compare the first time period which has the length of at least 10 consecutive bits of the received signal with the internal clock time interval that should represent the same number of bits. In a further embodiment, the clock bit comparator 312, CBC may compare the first time period which has the length of at least 20 consecutive bits of the received signal with the internal clock time interval that should represent the same number of bits.

The clock bit comparator 312, CBC optionally comprises an edge distance measurer 314, EDM and an error accumulator 318, EA. The edge distance measurer determines a difference between a length of a second time period and a length of a third time period, wherein the second time period is a period of time in between two consecutive falling or raising edges of the received signal 304 and the third time period represents an internal clock time period that should represent the same number of bits as the number of bits of the second time period. The edge distance measurer 314, EDM generates an error signal 316 which indicates, or in other words, represents, the difference between the lengths of the second time period and the third time period. The second time period is in between consecutive falling edges or in between consecutive raising edges and, consequently, the shortest possible length of the second time period is that of two consecutive bits (e.g. 0-1 or 1-0). As discussed in the context of FIGS. 1 and 2, the maximum number of bits in between two falling or raising edges is 10 bits in a CAN network, and, consequently, the maximum length of the second time period is 10 bits.

The error accumulator 318, EA receives the error signal 316 and accumulates differences indicated by the error signals until at least the length of the first time period of at least five consecutive bits of the received signal is compared to the lengths of internal clock time interval that should represent the same number of bits as the number of bits of the first time period. As discussed above, the second time period may be shorter than the at least five consecutive bits.

Thus, the measurement of a difference between the second period and the third period must be performed at least once more to have a first time period which has at least the length of five consecutive bits. The error accumulator 318, EA accumulates, which means "adds", the errors/differences of consecutive edge distance measurements. The error accumulator 318, EA generates the difference signal 320.

It is to be noted that the error accumulator 318, EA may dynamically chose for which number of consecutive error signals 316 the difference values between the second time period and the third time period are accumulated, such that the accumulated value relates to at least five received consecutive bits. However, in another embodiment, the error accumulator 318, EA always accumulates the differences indicated by a fixed amount of consecutive error signals. In yet a further embodiment, the error accumulator 318, EA accumulates the differences indicated by at least two consecutive error signals 318. In an embodiment, this is for at least 3 consecutive error signals. In an embodiment, this is done for at least 4 consecutive error signals. As discussed previously, the second time period has the length of 2 to 10 bits. Thus, when the differences of exactly two consecutive error signals are accumulated, the accumulated differences relate to 4 to 20 bits.

The adjustment signal generator 322, ASG receives the difference signal 320 and generates the earlier discussed frequency adjustment signal 332. As discussed previously, the frequency adjustment signal 332 may have different formats and different ways of transporting the information to indicate how the frequency must be adjusted. As discussed previously, the difference signal 320 may also indicate the transported information in different formats or different units. Thus, the adjustment signal generator 322, ASG translates the information of the difference signal towards suitable information for the internal clock 306, CLK. This is done in such a way that, when the internal clock 306, CLK adjusts the frequency of the clock signal 305 according to the frequency adjustment signal 332, the difference between the lengths of the first time period and the internal clock time interval reduces.

If the internal clock 306, CLK is running too fast, the relative position of the sampling moment moves in a forward direction within the period of time that represents a single bit of the received signal. If the difference is defined as: the length of the first time period of at least five consecutive bits of the received signal minus the length of the internal clock time interval that should represent the same number of bits as the number of bits of the first time period, the difference becomes a positive number when the internal clock 306, CLK is running too fast. If the difference is a positive number, the adjustment signal generator ASG, 322 generates a frequency adjustment signal 332 which indicates that the frequency of the internal clock 306, CLK must be reduced. Optionally, the frequency adjustment signal 332 indicates with which value the frequency must be reduced. Such an indicated value may be based on a standard mapping between the difference value indicated by the difference signal 320, but may also be based on a formula which takes into account more information than only the value of the difference signal. If the internal clock 306, CLK is running too slow, the relative position of the sample moment moves into a direction of the end of the period of time that represents a single bit of the received signal. If the difference is defined as described above, the difference becomes a negative value. When the difference is a negative value, the adjustment signal generator ASG, 332 generates a frequency adjustment signal 332 which indicates that the frequency of the generated clock signal 305 must become higher.

The internal clock 306, CLK must fulfill certain accuracy requirements. In a traditional CAN network the accuracy of the internal clock 306, CLK must be within 1.5% of the value specified by the CAN specification in order to guarantee that the receiver synchronization mechanisms defined in the CAN specifications result in a correct synchronization of the network receiver 300, NR with the received signal 304. If the internal clock 306, CLK has a frequency which is outside this accuracy limit, the network receiver 300, NR may sample the received signal 304 at incorrect moments of time which results in an incorrect digital output signal 310 and/or in the generation of an synchronizing error which indicates that the network receiver 300, NR is not capable of synchronization with the received signal 304. The network receiver 300, NR of the current invention provides means which allow the internal clock 306, CLK to operate with a wider accuracy range. In particular, the network receiver 300, NR comprises the clock bit comparator 312, CBC and the adjustment signal generator 322, ASG to correct the sampling moment for larger deviations of the internal clock 306, CLK from the specified clock frequencies. This allows the use of an oscillator that has been implemented on an integrated circuit and that does not have external components (such as a crystal). In particular in CAN network receivers which comprise a selective wake-up (CAN SWU) core, it is advantageous to be able to use such an fully integrated oscillator because standards define the pins of a package of integrated circuit that comprises such a CAN SWU and no additional pins are available for connecting the circuitry to, for example, a crystal. It is also advantageous to have the fully integrated oscillator because it reduces the price of the device. The function of the CAN SWU core is a circuitry which decodes received CAN (data) frames and compares it against wake-up criteria which have been described, for example, in the ISO 11898-6 document. If the wake-up criteria are fulfilled the CAN SWU core will initiate a wakeup of the full network node/network device and if the criteria are not fulfilled, no further actions are taken.

The adjustment signal generator 322, ASG optionally comprises a threshold slicer 324, TS. The threshold slicer 324, TS receives the difference signal 320 and compares the error/difference value indicated by the difference signal 320 with a first threshold value and with a second threshold value and generates a first adaptation signal 328 and a second adaptation signal 326 in accordance with the results of the comparisons. The first threshold value is a negative value and the second threshold value is a positive value. In specific embodiments, the first threshold value and the second threshold value are predetermined values, however, in other embodiments, the first threshold value and the second threshold value may be dynamically adapted by circuitry present in the device which comprises the network receiver 300, NR to, for example, adapt the threshold values to changed operational conditions. If the value indicated by the difference signal 320 is smaller than the first threshold value, the first adaptation signal 328 is generated. If the value indicated by the difference signal 320 is larger than the second threshold value, the second adaptation signal 326 is generated. The threshold slicer 324, TS may be used to prevent that for, e.g., too small errors a correction is made. Or the threshold values may be selected such that, when a difference is detected that is well-correctable by the standard CAN synchronization mechanisms, the network receiver 300, NR according to this invention does not change the frequency of the internal clock 306, CLK. If, the adjust signal generator 322, ASG comprises the threshold slicer 324, TS, the first and second adaptation signal 328, 326 are used to correct the frequency of the 306, CLK to, respectively, a higher or to a lower frequency (or, to, respectively, a lower or higher frequency). It is to be noted that the threshold slicer 324, TS may comprise more than two threshold values and compares the error/difference value of the difference signal 320 with three or more threshold values. For example, the threshold slicer 324, TS compare the error/difference value with a first to fourth range and generates four adaptation signals wherein each adaptation signal relates to one of the ranges. In this way the adjustment signal generator 322, ASG may be capable of generating the frequency adjustment signal such that the internal clock CLK, 306 can more precisely adapt the frequency of the generated clock signal 305 because the more than two adaptation signals provide more information about the magnitude of the error/difference value.

For example, the threshold slicer 324 TS has a first threshold value and a second threshold value which prevents that the adjustment signal generator 322, ASG corrects the frequency of the internal clock 306, CLK when the accuracy of the internal clock 306, CLK is within 1.5% of the frequency of the received signal 304 because known mechanisms in the CAN bus specification are able to correct for such inaccuracies. For example, when one bit is represented by 16 time quanta tq, and when the clock bit comparator 312, CBC compares a length of the first time period of five consecutive bits with the length of an internal clock time interval which has also the length of five bits, the five bits are represented by 80 time quanta tq, which results in a first threshold value of −2 and a second threshold value of 2.

The adjustment signal generator 322, ASG may optionally comprise a trimming adjustor 330, TA which receive the two or more adaptation signals 326, 328 and which generates the frequency adjustment signal 332. In particular when specific translations must be made between the information present in the two or more adaptation signals 326, 328 towards a signal that can be used by the internal clock 306, CLK to adapt the frequency of the generated clock signal 305, the trimming adjustor 330, TA has to fulfill this role. It is to be noted that the trimming adjustor 330, TA may also receive information from the internal clock 306, CLK which is needed to generated the frequency adjustment signal 332. For example, as described in the document "Application Note, AN2312/D 7/200, MC68HC908QY4 Internal Oscillation Usage Notes", written by Scott Paper and published in 2004 by Freescale Semiconductors, Inc., an internal oscillator may provide a specific frequency based on a value stored at a specific address of the memory of the device and by increasing or decreasing this stored value, the frequency may be decreased or increase (or vice versa). Thus, in this situation, the trimming adjustor 330, TA has to read the value stored at this specific address and generate a new value (which is provided in the frequency adjustment signal 332) and store the new value at the specific address.

Figure 4:
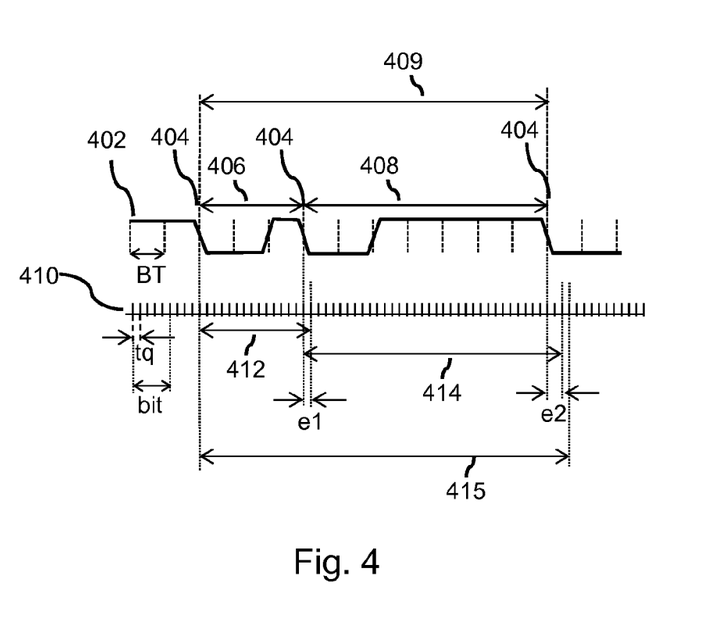

The different concepts of the above discussion are further discussed and explained together with FIG. 4.

The network receiver 300, NR of FIG. 3 may be used in a CAN Selective Wake-Up core (CAN SWU). The network receiver 300, NR and/or the CAN SWU core may be used in a CAN network device. The network receiver 300, NR, the CAN SWU core, and/or the CAN network device may be used in a CAN network. The CAN network, the CAN network device, the CAN SWU core, and/or the network receiver 300, NR may be used in a vehicle. The network receiver 300, NR may be integrated in an integrated circuit.

It is to be noted that the network receiver 300, NR of FIG. 3 may be implemented with dedicated hardware which performs the function of the different elements of the network receiver 300, NR. Some or all of the elements may also be embodiment in a general purpose processor or a signal processor which runs a specific computer program which causes the processor to perform action that correspond with the above discussed functions and operations of the respective elements. The received signal 304 may be an analogue signal, and, alternatively, the analogue network signal may also be sampled at a high frequency before being provided to the data sampler 308, DS and the clock bit comparator 312, CBC. Signals that are discussed above may be appropriate analogue or digital signals. If the signals are digital signals, they may be constituted by a single electrical connection along which the information of the signals is transmitted in a serial manner, or the signals may be constituted by a plurality of electrical connections along which several data symbols are simultaneously transmitted in a parallel manner. It is further to be noted that FIG. 3 presents a specific architecture in which specific functional block are drawn as separate blocks. However, in a real implementation specific function blocks may be combined or split into sub-blocks.

FIG. 4 shows the received signal 402 and the clock signal 410. Individual bits of the received signal 402 are indicated with the dashed lines and the length of a received single bit is indicated with BT. The clock signal 410 has a higher frequency than the received signal 402 and comprises clock sub-signals tq. A clock sub-signal is the smallest repeating signal portion of the clock signal 410. When the network to which the network receiver of the invention is coupled is a CAN bus, the clock sub-signal tq would be termed "time quanta". In the example of FIG. 4, the clock signal generates, when the clock is 100% accurate, 5 clock sub-signal tq during a time period of a single received bit. In practical CAN networks, the number of clock sub-signal tq that relate to the time period of one bit is often higher, for example 8 or 16. The value of 5 is purely exemplary and is used in this example such that time period of a single clock sub-signal tq could still be drawn (and recognized) in FIG. 4. It can also be seen in FIG. 4 that the clock signal 410 is not 100% accurate. When the image is carefully inspected, it can be seen that the clock signal 410 is relatively slow compared to the received signal 402—this means that, when a bit starts at the beginning of the first clock sub-signal tq, the received bit ends within the fifth clock sub-signal tq and does not end at the end of the fifth clock sub-signal tq. It is to be noted that, in another embodiment, the clock signal 410 could be too fast compared to the frequency of the received signal 420—this means that, when a bit starts at the beginning of the first clock sub-signal tq, the received bit ends within the sixth clock sub-signal tq.

At moments of time 404 the received signal 404 has falling edges. In the context of CAN busses this means that the signal transmitted by the CAN bus changes from a recessive state to a dominant state. In the discussion of FIG. 3, the edge distance measurer 314, EDM compares the second period of time with the third period of time. In FIG. 4, such a second period of time is indicated with period of time 406, and a consecutive second period of time is indicated with period of time 408. The second periods of time 406, 408 are in between falling edges of the received input signal 402. The third periods of time which belong to these respective second periods of time 406, 408 are, respectively, indicated by third periods of time 412, 414. The third period of time 412 starts at the moment that the second period of time 406 starts. During the second period of time 406 three bits are received, which means that the third period of time 412 is equal to 5 times 3=15 clock sub-signals—please note that, when the clock signal 410 was 100% accurate with respect to the frequency of the received signal 402, the end of the second period of time 406 and the end of the third period of time 412 would overlap. However, the received signal 402 has a falling edge, seen from the start of the second time period 406, at the end of the $14^{th}$ clock sub-signal. This means that the third time period 412 is 1 clock sub-signal longer. This error is indicated with e1. Thus, the edge distance measurer 314, EDM generates an error signal with the value 1. It is to be noted that instead of a positive value which indicates that the third time period 412 was one clock sub-signal longer than the second time period 406, based on an agreement on the format of the error signal, a negative value may also be used to indicate that the second time period 406 was one clock sub-signal shorter than the third time period 412. From the start of the consecutive second time period 408, a subsequent falling edge 404 is received after receiving 7 bits. Thus, the consecutive third time period 414 has the length of 35 clock sub-signals. However, as may also be seen, the end of the consecutive second time period 408 occurs 2 clock sub-signals before the end of the consecutive third time period 414—this difference is indicated with e2. Thus, the edge distance measurer 314, EDM generates an error signal which subsequently has the value of 2. The error accumulator 318, EA accumulates the received error signals and generates, therefore, a difference signal with the value 3.

In FIG. 4 two more time periods are indicated. The first time period of at least five consecutive bits which is analyzed by the clock bit comparator 312 CBC is indicated with 409. Expressed in bits, the length of the first time period 409 is 10 bits. The internal clock time interval which belongs to 10 bits is 50 clock sub-signals long and this time interval is indicated with 415.

Figure 5:
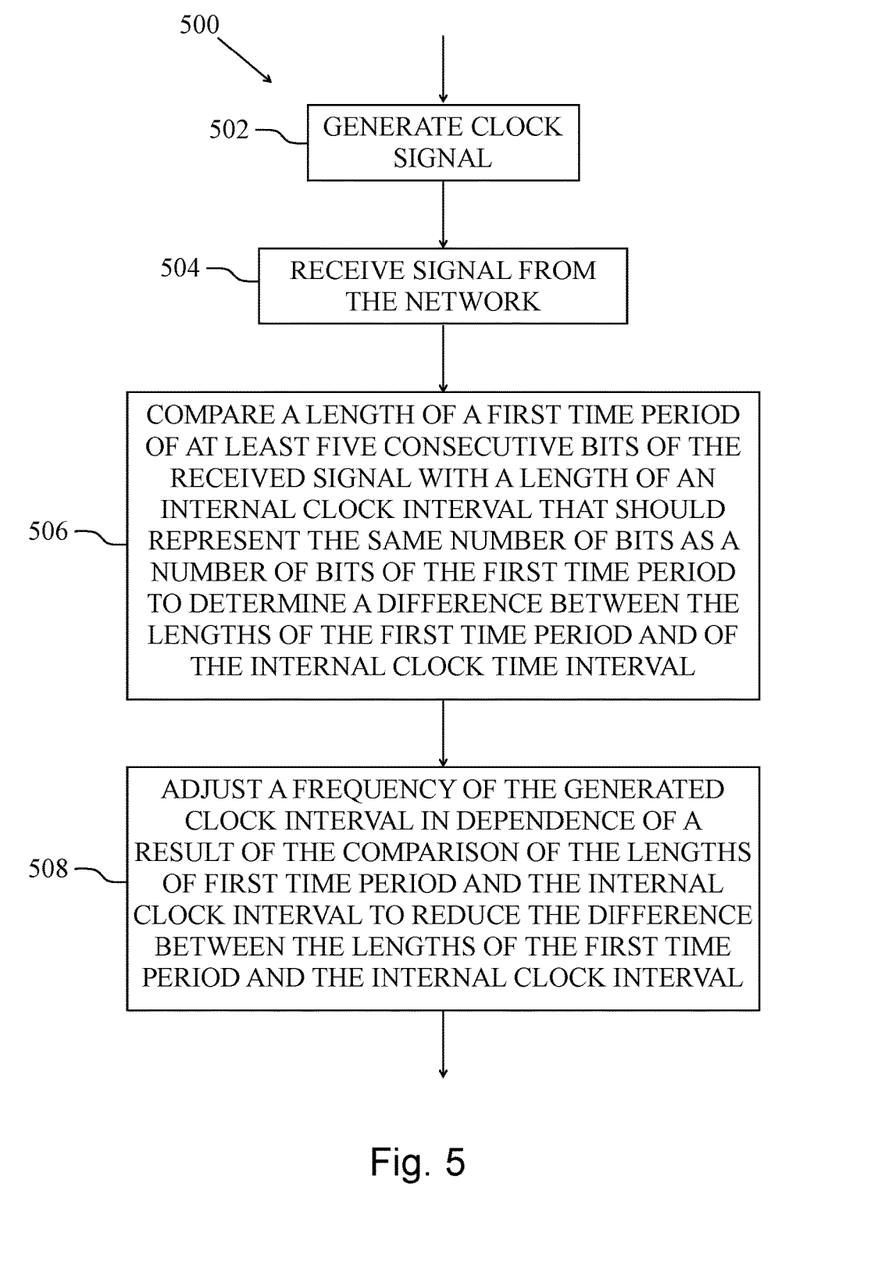

FIG. 5 schematically presents a method 500 of sampling at a network receiver a signal received from a network using distributed clock synchronization. The method 500 comprises the stages: i) generating 502 a clock signal, ii) receiving 504 a signal from the network, the signal representing a series of bits of information, iii) comparing 506 a length of a first time period of at least five consecutive bits of the received signal with a length of an internal clock interval that should represent the same number of bits as a number of bits of the first time period to determine a difference between the lengths of the first time period and of the internal clock time interval, iv) adjusting 508 a frequency of the generated clock interval in dependence of a result of the comparison of the lengths of first time period and the internal clock interval to reduce the difference between the lengths of the first time period and the internal clock interval.

It is to be noted that the method 500 of the invention provides the same benefits as the network receiver according to the invention and has similar embodiments with similar effects as the corresponding embodiments of the network receiver.

In an embodiment, a computer program is provided which comprises instructions for causing a processor system to perform the method 500 of the invention. In a further embodiment, the computer program is embodied on a computer readable medium. Thus, the invention may also be implemented in a computer program for running on a computer system, at least including code portions for performing steps of a method according to the invention when run on a programmable apparatus, such as a computer system or enabling a programmable apparatus to perform functions of a device or system according to the invention. The computer program may for instance include one or more of: a subroutine, a function, a procedure, an object method, an object implementation, an executable application, an applet, a servlet, a source code, an object code, a shared library/dynamic load library and/or other sequence of instructions designed for execution on a computer system. The computer readable media may include, for example and without limitation, any number of the following: magnetic storage media including disk and tape storage media; optical storage media such as compact disk media (e.g., CD-ROM, CD-R, etc.) and digital video disk storage media; nonvolatile memory storage media including semiconductor-based memory units such as FLASH memory, EEPROM, EPROM, ROM; ferromagnetic digital memories; MRAM; volatile storage media including registers, buffers or caches, main memory, RAM, etc.; and data transmission media including computer networks, point-to-point telecommunication equipment, and carrier wave transmission media, just to name a few.

In summary, the current application provides a network receiver for a network using distributed clock synchronization and a method of adjusting a frequency of an internal clock of the network receiver. The network receiver receives from the network a signal and has an internal clock for generating a clock signal. The network receiver further comprises a clock bit comparator and an adjustment signal generator. The clock bit comparator compares lengths of a first time period lapsed while receiving at least five consecutive bits of the signal and of an internal clock time interval representing the same number of bits as a number of bits of the first time period. The adjustment signal generator generates a frequency adjustment signal for controlling a frequency of the internal clock in dependence of a result of the comparison of the lengths to reduce a difference between the lengths.

In the foregoing specification, the invention has been described with reference to specific examples of embodiments of the invention. It will, however, be evident that various modifications and changes may be made therein without departing from the broader spirit and scope of the invention as set forth in the appended claims. For example, the connections may be any type of connection suitable to transfer signals from or to the respective nodes, units or devices, for example via intermediate devices. Accordingly, unless implied or stated otherwise the connections may for example be direct connections or indirect connections.

As used herein, the term "bus" is used to refer to a plurality of signals or conductors which may be used to transfer one. Logical values discussed in the application are purely exemplary and other logical values may be used according to a specific coding convention. Each signal described herein may be designed as positive or negative logic. In the case of a negative logic signal, the signal is active low where the logically true state corresponds to a logic level zero, or the other way around. In the case of a positive logic signal, the signal is active high where the logically true state corresponds to a logic level one, or the other way around. Note that any of the signals described herein can be designed as either negative or positive logic signals. Therefore, in alternate embodiments, those signals described as positive logic signals may be implemented as negative logic signals, and those signals described as negative logic signals may be implemented as positive logic signals.

The conductors which transfer a signal as discussed herein may be illustrated or described in reference to being a single conductor, a plurality of conductors, unidirectional conductors, or bidirectional conductors. However, different embodiments may vary the implementation of the conductors. For example, separate unidirectional conductors may be used rather than bidirectional conductors and vice versa. Also, plurality of conductors may be replaced with a single conductor that transfers multiple signals serially or in a time multiplexed manner. Likewise, single conductors carrying multiple signals may be separated out into various different conductors carrying subsets of these signals. Therefore, many options exist for transferring signals.

Because the apparatus implementing the present invention is, for the most part, composed of electronic components and circuits known to those skilled in the art, circuit details will not be explained in any greater extent than that considered necessary as illustrated above, for the understanding and appreciation of the underlying concepts of the present invention and in order not to obfuscate or distract from the teachings of the present invention.

The term "program," as used herein, is defined as a sequence of instructions designed for execution on a computer system. A program, or computer program, may include a subroutine, a function, a procedure, an object method, an object implementation, an executable application, an applet, a servlet, a source code, an object code, a shared library/dynamic load library and/or other sequence of instructions designed for execution on a computer system.

Some of the above embodiments, as applicable, may be implemented using a variety of different information processing systems. For example, although FIG. 3 and the discussion thereof describe an exemplary architecture, this exemplary architecture is presented merely to provide a useful reference in discussing various aspects of the invention. Of course, the description of the architecture has been simplified for purposes of discussion, and it is just one of many different types of appropriate architectures that may be used in accordance with the invention. Those skilled in the art will recognize that the boundaries between logic blocks are merely illustrative and that alternative embodiments may merge logic blocks or circuit elements or impose an alternate decomposition of functionality upon various logic blocks or circuit elements.

Thus, it is to be understood that the architectures depicted herein are merely exemplary, and that in fact many other architectures can be implemented which achieve the same functionality. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the functionality of the above described operations merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

Also, the invention is not limited to physical devices or units implemented in non-programmable hardware but can also be applied in programmable devices or units able to perform the desired device functions by operating in accordance with suitable program code. Furthermore, the devices may be physically distributed over a number of apparatuses, while functionally operating as a single device.

Also, devices functionally forming separate devices may be integrated in a single physical device. Also, the units and circuits may be suitably combined in one or more semiconductor devices.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

The invention claimed is:

1. A network receiver for a network using distributed clock synchronization, the network receiver comprising:
    an input for receiving an input signal from the network, the input signal representing a series of bits;
    an internal clock for generating a clock signal, the internal clock being configured to receive a frequency adjustment signal for adjusting a frequency of the clock signal;
    a clock bit comparator configured to compare a length of a first time period lapsed while receiving at least five consecutive bits of the input signal with a length of an internal clock time interval being a sub-interval of the clock signal and representing the same number of bits as a number of bits of the first time period and the clock bit comparator being configured to generate a difference signal indicating a difference between the lengths of the first time period and the internal clock time interval; and
    an adjustment signal generator configured to receive the difference signal and configured to generate the frequency adjustment signal for controlling the frequency of the clock signal towards a frequency which reduces the difference between the lengths of the first time period and the internal clock time interval.

2. The network receiver according to claim 1, wherein the clock bit comparator is configured to compare the length of the first time period lapsed while receiving at least ten consecutive bits of the input signal with the length of the internal clock time interval representing the same number of bits as the number of bits of the first time period.

3. The network receiver according to claim 1, wherein the clock bit comparator comprises:
   an edge distance measurer configured to determine a difference between a length of a second time period and a length of a third time period and configured to generate an error signal, the second time period being a period of time which starts when a falling edge is received in the input signal and ends when a consecutive falling edge is received in the input signal or which starts when a raising edge is received in the input signal and ends when a consecutive raising edge is received in the input signal, the third time period being a subinterval of the clock signal and representing the same number of bits as the number of bits of the second time period, the error signal representing the difference between the lengths of the second time period and the third time period; and
   an error accumulator configured to receive the error signal and to generate the difference signal, wherein the error accumulator is configured to accumulate differences of error signals until the first time period of at least five consecutive bits of the input signal is compared to the internal clock time interval that represents the same number of bits as the number of bits of the first time period, thereby the first time period being formed by a plurality of second time periods and the internal clock interval being formed by a plurality of third time periods.

4. The A-network receiver according to claim 3, wherein the error accumulator is configured to accumulate differences of at least two consecutive error signals.

5. The network receiver according to claim 1, wherein the adjustment signal generator comprises:
   a threshold sheer configured to receive the difference signal, to compare the difference indicated by the difference signal with a first threshold value to generate a first adaptation signal, and to compare the difference indicated by the difference signal with a second threshold value to generate a second adaptation signal, the first threshold value is smaller than zero and the second threshold value is larger than zero, wherein the adjustment signal generator is configured to generate the frequency adjustment signal in dependence of the first adaptation signal and the second adaptation signal.

6. The network receiver according to claim 5 wherein the threshold slicer is configured to compare the difference indicated by the difference signal with three or more threshold values and to generate three or more adaptation signals in dependence of the comparison of the difference signal with the three or more threshold values.

7. The network receiver according to claim 5, wherein the adjustment signal generator further comprises:
   a trimming adjustor configured to receive the first adaptation signal, to receive the second adaptation signal, and to generate the frequency adjustment signal in dependence of the received adaptation signals.

8. The network receiver according to claim 1, wherein the clock signal comprises repeating clock sub-signals that are the smallest repeating unique clock signal portions, and the length of the period of time of a single bit of the input signal is, when the internal clock has exactly the same frequency as the input signal, equal to the length of an integer number of consecutive clock sub-signals.

9. The network receiver according to claim 8, wherein a length of the internal clock time interval is defined by the length of a single clock sub-signal times the number of bits of the first time period times the integer number of clock sub-signals in which a single bit is subdivided.

10. The network receiver according to claim 8, wherein the difference signal comprises an integer number that indicates how many clock sub-signals the internal clock time interval was longer than the first time period.

11. The network receiver according to claim 1, wherein the network is a Controller Area Network (CAN).

12. The network receiver according to claim 1 further comprising a data sampler for sampling the input signal received at the input, the data sampler being configured to sample the input signal at sampling moments to obtain a digital data signal, the sampling moments have a specific relative position with respect to the start of the bits and the end of the bits.

13. The network receiver according to claim 1, wherein the internal clock is configured to, after the network receiver is controlled in an operational mode, generate the clock signal having a factory-preset frequency.

14. The network receiver according to claim 1, wherein the internal clock is configured to tune the frequency of the clock signal according to one of the following:
   tuning a current source of the internal clock in dependency of the frequency adjustment signal,
   tuning a voltage source of the internal clock in dependency of the frequency adjustment signal,
   controlling a network resistor of an RC loop of the internal clock in dependency of the frequency adjustment signal, and
   controlling a network capacitor of the RC loop of the internal clock in dependency of the frequency adjustment signal,
wherein, in all the above optional configurations, the frequency adjustment signal comprises bytes of parallel transmitted binary bits or the frequency adjustment signal comprises a pulse width modulated binary signal.

15. A CAN network device comprising the network receiver according to claim 1.

16. The network receiver according to claim 15, wherein the network receiver further comprises a Controller Area Network Selective Wake-Up core (CAN SWU) configured to initiate a wake-up of the CAN network device.

17. A vehicle comprising the CAN network device according to claim 15.

18. A vehicle comprising the network receiver according to claim 1.

19. An integrated circuit comprising the network receiver according to claim 1.

20. A method of adjusting a frequency of an internal clock of a network receiver for a network using distributed clock synchronization, the method comprises:
   generating a clock signal;
   receiving a signal from the network, the signal representing a series of bits;
   comparing a length of a first time period lapsed while receiving at least five consecutive bits of the signal with a length of an internal clock time interval being a subinterval of the clock signal and representing the same number of bits as a number of bits of the first time period to determine a difference between the lengths of the first time period and the internal clock time interval; and
   adjusting a frequency of the generated clock signal in dependence of a result of the comparison of the lengths of the first time period and the internal clock time interval to reduce the difference between the lengths of the first time period and the internal time clock interval.

* * * * *